United States Patent [19]
Hsi-Chang

[11] Patent Number: 6,003,290
[45] Date of Patent: Dec. 21, 1999

[54] VENTILATED PROTECTIVE COVER FOR A HORSE

[75] Inventor: Chang Hsi-Chang, Taichung, Taiwan

[73] Assignee: Eastwest International (Taiwan) Enterprises, Taichung, Taiwan

[21] Appl. No.: 09/030,322

[22] Filed: Feb. 25, 1998

[51] Int. Cl.⁶ .................................................. B68C 5/00
[52] U.S. Cl. ............................ 54/79.1; 54/79.4; 119/850
[58] Field of Search ................................... 54/79.1, 79.4, 54/66, 79.2; 119/850; 5/485, 482, 417; 135/115, 93; 52/3

[56] References Cited

U.S. PATENT DOCUMENTS

| | | | |
|---|---|---|---|
| 117,118 | 7/1871 | Sibley | 54/79.1 |
| 312,880 | 2/1885 | McPherson | 54/79.2 |
| 778,620 | 12/1904 | Wylie et al. | 52/3 |
| 798,320 | 8/1905 | Carli | 54/79.2 |
| 890,581 | 6/1908 | Wood | 54/79.1 |
| 1,293,521 | 2/1919 | O'brien et al. | 54/79.2 |
| 3,626,663 | 12/1971 | Moon | 54/79.2 |
| 3,785,451 | 1/1974 | McCord | 180/69.1 |
| 4,169,428 | 10/1979 | Waugh | 119/482 |

*Primary Examiner*—Thomas Price
*Assistant Examiner*—Son T. Nguyen
*Attorney, Agent, or Firm*—Antonio R. Durando

[57] ABSTRACT

A horse blanket that includes a plurality of grommeted netted eyelets to provide ventilation to the portion of the horse's body covered by the blanket. Each netted eyelet is also covered by a flap that is attached to the blanket above the eyelet but is free below the eyelet. The grommets defining the edge of each eyelet are sufficiently thick to provide a relief structure to prevent water that may reach the hole from passing through under the blanket. The netting material overlapping the eyelet ensures that insects and debris also cannot infiltrate the blanket. On the other hand, sweat and other moisture created under the blanket can escape through the covered eyelets and the horse is kept dry and comfortable.

17 Claims, 2 Drawing Sheets

VENTILATED PROTECTIVE COVER FOR A HORSE

BACKGROUND OF THE INVENTION

1. Field of the Invention

This invention pertains to the field of equestrian accessories. In particular, it relates to a protective rain cover that is fitted with ventilation openings to improve comfort of a horse.

2. Description of the Related Art

Horse blankets and water-resistant rain covers have been in use for a long time. The best modern water-resistant sheets are typically made with laminated materials that permit passage of moisture from the inside out but prevent flow in the opposite direction. These materials are said to allow "breathing." They are often also coated with a permeable inside layer for comfort.

These materials are expensive to manufacture, especially for equestrian use. Therefore, a less costly approach would be welcome by the industry. This invention is directed at a simple solution to providing such an improvement.

BRIEF SUMMARY OF THE INVENTION

The primary goal of this invention is to provide breathing to a water-resistant rain cover for a horse, such that the animal will stay dry even under wet and warm conditions.

Another goal is to provide or increase such breathing by means of natural ventilation.

Finally, an objective of the invention is a ventilated rain cover that can be manufactured with inexpensive single-layer impermeable material.

Therefore, according to these and other objectives, the present invention consists of a horse blanket that includes a plurality of grommeted netted eyelets to provide ventilation to the portion of the horse's body covered by the blanket. Each netted eyelet is also covered by a flap that is attached to the blanket above the eyelet but is free below the eyelet. The grommets defining the edge of each eyelet are sufficiently thick to provide a relief structure to prevent water that may reach the hole from passing through under the blanket. The netting material overlapping the eyelet ensures that insects and debris also cannot infiltrate the blanket. On the other hand, sweat and other moisture created under the blanket can escape through the covered eyelets and the horse is kept dry and. comfortable.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose but some of the various ways in which the invention may be practiced.

DESCRIPTION OF THE PREFERRED EMBODIMENTS OF THE INVENTION

Figure 1:
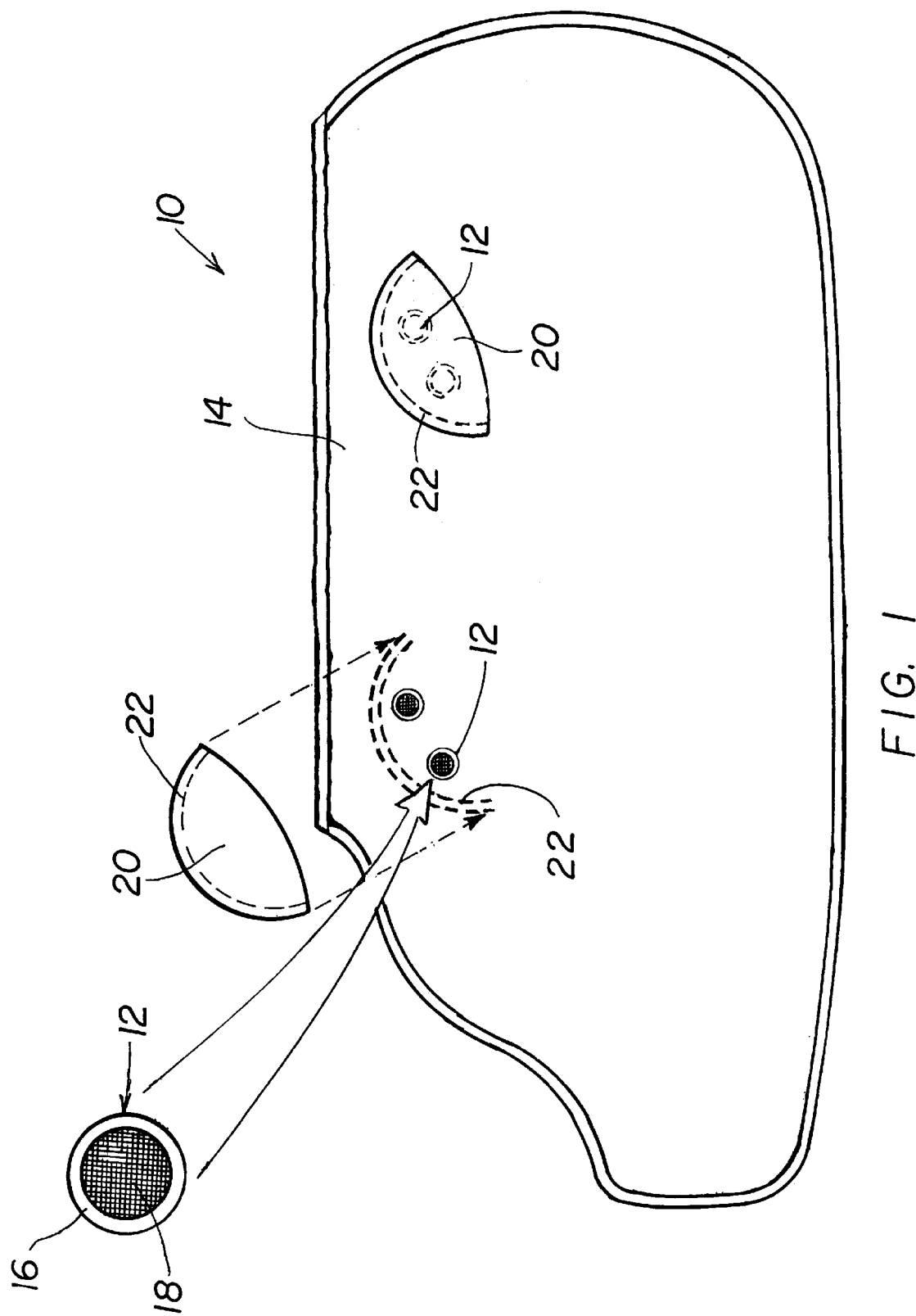
FIG. 1 is an elevational side view of a horse blanket according to the invention, shown as it would be seen while worn by a horse.

The idea of this invention is the inclusion of ventilation holes in the traditional design of a horse blanket in order to provide breathing under sweaty conditions. Referring to the drawings, wherein like reference numerals refer to like parts throughout, FIG. 1 is a side view of an impermeable horse blanket 10 according to the invention, seen as it would appear hanging from a horse. The blanket 10 is made with a sheet of water-resistant material tailored to fit a normal horse. These design criteria are not detailed here because well known in the art.

The blanket 10 comprises a plurality of netted holes or eyelets 12 scattered mainly throughout the upper portion 14 of the blanket, especially at the junctions (front and back) between the horse's legs and body, which is where horses sweat most and are mostly in need of ventilation when covered by a water-resistant blanket. As better seen in the enlarged particulars of FIG. 1, the perimeter of each hole 12 is attached to a grommet 16 sufficiently thick to provide a raised edge to prevent water accumulated around the hole from flowing into the hole. Netting material 18 is also used to cover each eyelet 12, so that insects, debris and other undesirable particles are prevented working their way under the blanket 10 through the eyelets of the invention. Moreover, all eyelets 12 are loosely covered by waterproof flaps 20 attached to the blanket 10, such as by stitches 22 sewn through the blanket by sealed by waterproof tape on the back to ensure impermeability at the point of connection.

Each flap 20 is attached above one or more eyelets 12, as illustrated in the partial exploded view of FIG. 1, such that the flap loosely overlaps the holes to prevent rain or outside moisture from penetrating through the holes. Because the lower portion of the flaps 20 is not attached to the blanket 10, air can freely flow through the netted eyelets 12 and provide ventilation to the portions of the horse's body covered by the blanket. The horse's movements and wind can further enhance ventilation through the eyelets 12. Because of the thickness of the grommets 16 and the corresponding relief provided by them over the blanket sheet, the flaps 20 are also slightly separated from the blanket 10, so that air flow is present even when the horse is standing still and no wind is present. A single flap 20 can be used to cover more than one hole 12, as shown in the figures.

Figure 2:
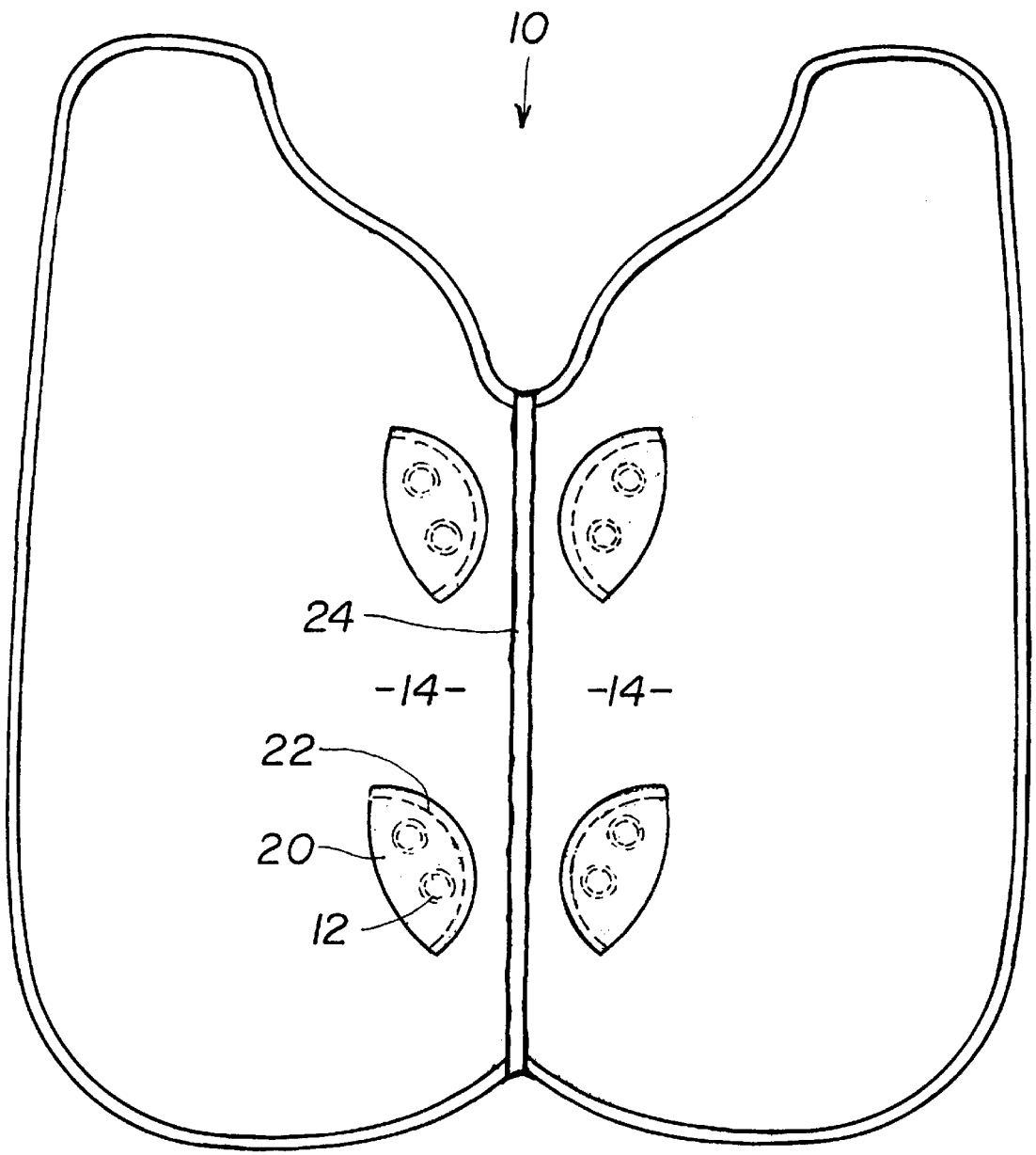
FIG. 2 is a plan view of the horse blanket of the invention, as seen front-side up while laying on a flat support.

FIG. 2 illustrates a blanket 10 according to the invention as seen in plan view on a flat supporting surface. The blanket essentially consists of two symmetrical portions corresponding to each side of a horse. The sides can be attached along a common edge 24 or made as an article of unitary construction. I found that four eyelets 12 approximately 10 to 25 mm in diameter on each side of the blanket are sufficient to significantly improve ventilation under an otherwise impermeable blanket 10. The ventilation has proven to provide significant comfort to a horse, especially under wet conditions. Eyelets varying in size from to 1.5 to 2.5 mm in diameter are preferred.

Various changes in the details, steps and components that have been described may be made by those skilled in the art within the principles and scope of the invention herein illustrated. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. A ventilated horse blanket comprising:

an impermeable horse blanket;

a plurality of eyelets in the blanket;

netting material covering each eyelet; and water-resistant means for covering said eyelets;

wherein said water-resistant means is partially attached to the blanket and partially loose to allow air flow through the eyelets.

2. The blanket of claim 1, further comprising a grommet affixed to the perimeter of each eyelet.

3. The blanket of claim 2, wherein said grommet affixed to the perimeter of each eyelet is sufficiently thick to provide a raised edge to prevent water accumulated around the eyelet from flowing therethrough.

4. The blanket of claim 3, wherein said water-resistant means for covering said eyelets consists of at least one flap covering at least one eyelet, said at least one flap being partially attached to the blanket and partially loose thereon.

5. The blanket of claim 4, wherein said at least one flap is attached to the blanket by stitching the flap above said at least one eyelet covered thereby.

6. The blanket of claim 5, wherein said eyelets are about 10 to 25 mm in diameter.

7. The blanket of claim 1, wherein said water-resistant means for covering said eyelets consists of at least one flap covering at least one eyelet, said at least one flap being partially attached to the blanket and partially loose thereon.

8. The blanket of claim 7, wherein said at least one flap is attached to the blanket by stitching the flap above said at least one eyelet covered thereby.

9. The blanket of claim 1, wherein said eyelets are about 10 to 25 mm in diameter.

10. The blanket of claim 1, wherein said grommet affixed to the perimeter of each eyelet is sufficiently thick to provide a raised edge to prevent water accumulated around the eyelet from flowing therethrough.

11. The blanket of claim 10, wherein said water-resistant means for covering said eyelets consists of at least one flap covering at least one eyelet, said at least one flap being partially attached to the blanket and partially loose thereon.

12. The blanket of claim 11, wherein said at least one flap is attached to the blanket by stitching the flap above said at least one eyelet covered thereby.

13. The blanket of claim 12, wherein said eyelets are about 10 to 25 mm in diameter.

14. The blanket of claim 1, wherein said water-resistant means for covering said eyelets consists of at least one flap covering at least one eyelet, said at least one flap being partially attached to the blanket and partially loose thereon.

15. The blanket of claim 14, wherein said at least one flap is attached to the blanket by stitching the flap above said at least one eyelet covered thereby.

16. The blanket of claim 15, wherein said eyelets are about 10 to 25 mm in diameter.

17. The blanket of claim 1, wherein said eyelets are about 10 to 25 mm in diameter.

* * * * *